(12) United States Patent
Pflipsen (10) Patent No.: US 12,193,357 B2
(45) Date of Patent: Jan. 14, 2025

(54) LIFTING DEVICE FOR LIFTING ROOT CROPS

(71) Applicant: Grimme Landmaschinenfabrik GmbH & Co. KG, Damme (DE)

(72) Inventor: Klaus Pflipsen, Damme (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 748 days.

(21) Appl. No.: 17/284,905

(22) PCT Filed: Oct. 10, 2019

(86) PCT No.: PCT/EP2019/077529
§ 371 (c)(1),
(2) Date: Apr. 13, 2021

(87) PCT Pub. No.: WO2020/083659
PCT Pub. Date: Apr. 30, 2020

(65) Prior Publication Data
US 2021/0378168 A1  Dec. 9, 2021

(30) Foreign Application Priority Data

Oct. 22, 2018 (DE) .................. 10 2018 126 211.6

(51) Int. Cl.
*A01D 25/00* (2006.01)
*A01D 25/04* (2006.01)
(52) U.S. Cl.
CPC ......... *A01D 25/005* (2013.01); *A01D 25/044* (2013.01)

(58) Field of Classification Search
CPC .... A01D 25/005; A01D 25/044; A01D 25/04; A01D 25/00
See application file for complete search history.

(56) References Cited

U.S. PATENT DOCUMENTS 2,579,274 A * 12/1951 Richey ................. A01D 34/305
280/483
2,682,739 A *  7/1954 Bozeman et al. ..... A01D 25/04
171/58
(Continued)

FOREIGN PATENT DOCUMENTS

CN  2671316  1/2005
CN  202232151 U  5/2012
(Continued)

*Primary Examiner* — Thomas B Will
*Assistant Examiner* — Joel F. Mitchell
(74) *Attorney, Agent, or Firm* — Husch Blackwell LLP (57) ABSTRACT

A lifting device for lifting root crops comprises at least one lifting share mounting which supports at least one lifting share. The at least one lifting share includes a front pick-up region in a lifting direction and a rear ejection region in the lifting direction for the root crops. The lifting share mounting is coupled to a lifting device frame, and during operation is pulled thereby in the lifting direction. The lifting share mounting is movable relative to the lifting device frame and, viewed in the lifting direction, laterally from an initial position into an offset position. A guide arrangement is configured to guide the lifting share mounting such that with the movement of the lifting share mounting from the initial position into the offset position the pick-up region is laterally displaced further than the ejection region, as well as a harvesting machine, in particular for harvesting beets.

14 Claims, 5 Drawing Sheets

(56) References Cited

U.S. PATENT DOCUMENTS

| | | | | |
|---|---|---|---|---|
| 3,139,938 A | * | 7/1964 | Parrish et al. | A01D 25/04 |
| | | | | 171/58 |
| 3,191,686 A | * | 6/1965 | Everett et al. | B07B 1/155 |
| | | | | 171/58 |
| 3,419,084 A | * | 12/1968 | Barows et al. | A01D 25/04 |
| | | | | 171/58 |
| 3,454,099 A | * | 7/1969 | Wells | A01D 25/04 |
| | | | | 171/58 |
| 4,993,695 A | * | 2/1991 | Taylor et al. | A01B 61/044 |
| | | | | 172/710 |
| 10,159,179 B2 | | 12/2018 | Kemper et al. | |
| 10,327,380 B2 | * | 6/2019 | Borgmann et al. | A01D 25/04 |

FOREIGN PATENT DOCUMENTS

| | | |
|---|---|---|
| CN | 202722029 | 2/2013 |
| CN | 108029320 A | 5/2018 |
| CN | 207604204 | 7/2018 |
| CN | 207783567 | 8/2018 |
| DE | 2701118 A1 | 7/1978 |
| DE | 2942717 A1 | 5/1981 |
| DE | 3233398 A1 | 3/1984 |
| DE | 3927169 A1 | 3/1990 |
| DE | 102005049652 A1 | 4/2007 |
| SU | 709020 A | 1/1980 |

\* cited by examiner

LIFTING DEVICE FOR LIFTING ROOT CROPS

CROSS REFERENCE

This application claims priority to PCT Application No. PCT/EP2019/077529, filed Oct. 10, 2019, which itself claims priority to German Application No. 10 2018 126211.6, filed Oct. 22, 2018, the entirety of both of which are hereby incorporated by reference.

FIELD OF THE INVENTION

The invention relates to a lifting device for lifting root crops. The lifting device comprises at least one lifting share mounting which supports at least one lifting share. The lifting share has a front pick-up region in a lifting direction and a rear ejection region in the lifting direction for the root crops. The lifting share mounting is coupled to a lifting device frame and during operation is pulled thereby in the lifting direction. The lifting share mounting is movable relative to the lifting device frame and, viewed in the lifting direction, laterally from an initial position into an offset position.

BACKGROUND

During operation, the lifting device is advanced in the lifting direction over a field on which the root crops are grown. In this case the lifting shares are partially immersed in the ground, pick up the root crops in the pick-up region and lift up the root crops. The root crops are then removed from the ejection region of the lifting share. In this case the lifting share mounting is movable transversely to the lifting direction in order to be able to follow a root crop row, the path thereof deviating locally from the lifting direction.

Such lifting devices are known from the prior art, in which the lifting share mounting is arranged so as to be pivotably movable relative to the lifting device frame about a pivot axis running in the lifting direction, and is otherwise fixed. A drawback with this construction is that during operation the root crops are discharged from the ejection region at positions which significantly differ locally, whereby during operation there is an uneven distribution of the root crops, in particular, on a conveying device downstream of the lifting share. Moreover, during operation the lifting share is able to follow the path of the root crop row only to a small degree, wherein a significant oblique position of the lifting share associated with its lateral movement impairs the lifting up of the root crops. In particular, with the use of a laterally immovable ejector for ejecting the root crops away from the at last one lifting share, the lateral mobility of the lifting share mounting and thus of the pick-up region is additionally limited even further.

BRIEF SUMMARY OF THE INVENTION

It is the object of the present invention to provide a generic lifting device with increased lifting capacity and greater utilization. In particular, the proportion of root crops to be picked up undamaged from the ground during operation is intended to be increased and the stoppage times of the lifting device reduced.

According to the invention, the object is achieved by a generic lifting device which has a guide arrangement for guiding the lifting share mounting. This guide arrangement is configured such that, with the movement of the lifting share mounting from the initial position into the offset position, the pick-up region is laterally displaced further than the ejection region.

The lifting device serves for picking up root crops, in particular beets, potatoes or carrots, from the ground and in particular for forwarding the root crops onto conveying devices following the lifting device. In this case the lifting device preferably has a plurality of lifting share mountings, in particular six to twelve thereof, which are arranged adjacent to one another in the lifting direction and which are coupled to the lifting device frame. In particular, the lifting device according to the invention is preferably used as the leading part of a mobile harvesting machine. During operation, each lifting share mounting is assigned to a row of root crops which extends at least globally and/or at least substantially in the lifting direction.

The term "lifting share" is commonly used in practice with various articles, in particular the lifting share according to the invention is also denoted in the prior art with the same meaning as the lifting shares or the lifting share.

During operation, the pick-up region of the lifting share initially reaches the root crops to be harvested. A force is then applied from the lifting share to the root crops, these root crops being released from the ground and, in particular, transported upwardly thereby. The pick-up region is, in particular, the region of the lifting share which during the lifting process faces the root crops and which preferably initially cooperates with the root crops to be harvested and/or makes contact therewith during the lifting process. The pick-up region in this case is preferably a region which is fixed, relative to the lifting share mounting, of the lifting share which is fixed or circulates relative to the lifting share mounting. In particular, in this case at least during operation the lifting share is not displaceable relative to the lifting share mounting, preferably the position thereof and/or the position of a lifting share circumferential axis being able to be changed relative to the lifting share mounting outside operation. In this case, the lifting share, in particular, is releasably fastened to the lifting share mounting or alternatively preferably integrally configured with the lifting share mounting.

The ejection region of the lifting share, as well as the pick-up region, is a region of the lifting share which is fixed relative to the lifting share mounting and from which the root crops are ejected, i.e. separated from the lifting share and removed therefrom. In this case, in particular, an ejection element is used for the ejection, said ejection element applying to the root crops an ejection force which is oriented at least partially from the pick-up region to the surroundings, in particular counter to the lifting direction. During operation, the pick-up region of the lifting share is arranged, in particular, below the ground surface, wherein the ejection region is arranged above the ground surface.

The lifting share mounting is configured, in particular, as a rigid lever or rigid strut and serves for transmitting force from the lifting device frame to the at least one lifting share. In particular, in the initial position the lifting share mounting preferably extends primarily in a frame longitudinal plane or a direction arranged parallel thereto or therein, and, in particular, is centrally intersected by the frame longitudinal plane. The frame longitudinal plane in this case is located, in particular, at right angles to a contact surface of the harvesting machine comprising the lifting device. In particular, in the initial position the lifting share mounting is configured at least substantially, in particular exactly mirror-symmetrically, relative to the frame longitudinal plane.

The lifting direction, in particular, is the direction in which the lifting device frame advances during operation and thus, in particular, the direction of travel of a harvesting machine comprising the lifting device. The lifting direction is preferably horizontal and parallel to a longitudinal central axis of the lifting device. Whilst during operation the rows of root crops to be harvested run generally substantially parallel to the lifting direction, locally they deviate laterally therefrom, i.e. transversely to the lifting direction. Thus whilst the ideal root crop positions of root crops assigned to the same row are located on one line, in particular a straight line parallel to the lifting direction, due to uneven growth of the root crops the actual root crop positions deviate laterally from this line during harvesting.

So that, in spite of these deviations, the lifting share is able to pick up the greatest possible proportion of root crops and is able to follow the row of root crops, the lifting share mounting is laterally movable relative to the lifting device frame from the initial position into the offset position. Preferably, during operation the lifting device frame is laterally movable in a continuous or stepwise manner into the offset position. In particular, with a plurality of lifting share mountings of the lifting device, these lifting share mountings in each case are able to follow the row assigned thereto, whilst the frame is merely advanced in the lifting direction. In the initial position the lifting share mounting is oriented such that during operation the root crops are optimally harvested, the actual root crop position thereof corresponding to the ideal. The aforementioned imaginary line in this case runs at least partially in or through the frame longitudinal axis.

The lifting share mounting has, in particular, two offset positions, the lifting share mounting being movable toward different sides from the initial position in order to reach these offset positions. In particular, in one offset position the lifting share mounting is located to the right of the initial position and in the other offset position to the left of the initial position in the direction of travel. During the movement from the initial position into the offset position, therefore, the lifting share is moved at least partially in a transverse direction which is arranged horizontally and at right angles to the lifting direction. In particular, the lifting share mounting may be transferred both in the transverse direction into an offset position and counter to the transverse direction out of the initial position into an opposing offset position. Thus it is possible to pick up root crops which are arranged both to the left and right of the optimal root crop position for the lifting device during operation.

During operation, the lifting share mounting is pulled by the lifting device frame. The lifting device frame is located at least partially in the lifting direction upstream of the lifting share mounting which is movably fastened thereto. By means of the lifting device frame, in particular, a pulling force is applied to the lifting share mounting. During operation the lifting share mounting is configured downstream of the lifting device frame, whereby in particular with a straight advancing movement of the lifting device in the lifting direction, and in the absence of transverse forces on the lifting shares or the lifting share mounting, the lifting share mounting is preferably automatically returned into the initial position. In particular, the return is effected at least partially by the lifting share mounting with the at least one lifting share in the initial position having the lowest potential energy, whereby during operation, in particular when lifting out the lifting share from the soil, gravity effects a return into the initial position.

The guide arrangement is located, in particular, between the lifting share mounting and the lifting device frame. Components of the guide arrangement are in this case fixed, in particular, relative to the lifting share mounting or to the lifting device frame and/or are integral therewith. By means of the guide arrangement the lifting share mounting is guided with the lateral movement from the initial position into the offset position and as a result is located in the offset position, such that the pick-up region of the lifting share is displaced further in the transverse direction and relative to its location in the initial position than the ejection region is displaced in the transverse direction and relative to its location in the initial position. By the configuration of the guide arrangement and the mobility associated therewith of the pick-up region in the transverse direction, root crops located at a distance from their ideal root crop position may be picked up by the lifting share, wherein the ejection region of the lifting share only deviates slightly from its location in the initial position. As a result, firstly a greater proportion of the root crops located in the soil may be picked up by the lifting device and at the same time it is ensured that the root crops are ejected from the lifting share at a substantially uniform position and thus locally continuously. Thus the lifting capacity may be increased both by a greater adaptability of the lifting share mounting with the lifting share to the root crops to be harvested, and by an only slight lateral displacement of the ejection region caused thereby. As a result, a conveying device following the lifting share is provided uniformly with root crops, in particular in the case of a plurality of lifting share mountings adjacent to one another, and thus with greater utilization and the avoidance of local blockages limiting the lifting speed.

Preferably the guide arrangement comprises sensors for determining the position of the root crops to be harvested, before these root crops reach the pick-up region. Using sensor data, the lifting share mounting may then be moved laterally by actuators encompassed by the guide arrangement. By means of this construction the lifting device may be oriented at high resolution and rapidly to the row of root crops to be lifted and as a result a particularly high proportion of the root crops to be harvested may be lifted undamaged.

Alternatively, the lifting share mounting is preferably coupled to the lifting device frame such that the movement from the initial position into the offset position and back again is carried out automatically during operation. In particular, the movement is simply triggered by the row of root crops and by transverse forces exerted by the root crops on the lifting share. Preferably, the lifting share mounting is at least partially displaced in the transverse direction by the contact of the lifting share with at least one root crop. In this case the lifting device, in particular, is free of an adjustable actuator which actively displaces the lifting share mounting in the transverse direction. An advantage of this embodiment is the lifting device being less prone to error and thus reduced stoppage times thereof. By the above-described guide arrangement a smaller mass moment of inertia of the lifting share has to be overcome for a lateral movement of the pick-up region, whereby for a movement of the lifting share mounting smaller forces act between the lifting share mounting and the root crops during operation.

In an advantageous embodiment of the invention, the guide arrangement is configured such that the lifting device has a pivot axis which is pivoted relative to the horizontal and which is arranged in the vertical frame longitudinal plane in the lifting direction behind the lifting share mounting. The lifting share mounting is at least partially pivoted about said imaginary geometric pivot axis, with the movement from the initial position into the offset position. The pivot axis in this case, in particular, is at right angles to the horizontal and, in particular, also at right angles to the lifting direction. By this arrangement of the pivot axis, with the movement of the lifting share mounting from the initial position into the offset position, the front pick-up region in the lifting direction, in particular, is moved further transversely to the frame longitudinal plane than the rear ejection region in the conveying direction. By the arrangement of the pivot axis and, in particular, a small spacing thereof from the lifting share and/or the ejection region thereof, it is achieved in a manner which is particularly reliable and permits a structurally simple embodiment of the invention that the position of the ejection region is substantially constant relative to the movement of the lifting share. In particular, the pivoting of the lifting share mounting about the pivot axis with the movement of the lifting share mounting from the initial position into the offset position is superimposed by a pivoting of the lifting share mounting about a further axis or a displacement of the lifting share mounting. As a result, the movement characteristic of the lifting share may be further optimized in favor of the lifting capacity and, in particular, in addition to the aforementioned advantages an automatic return into the initial position may be achieved during operation.

Preferably, the lifting device has a tilt axis parallel to the lifting direction. The lifting share mounting tilts at least partially about this imaginary geometric tilt axis, with the movement from the initial position into the offset position. In this case, viewed in the lifting direction the tilt axis is arranged, in particular, above the lifting share. This embodiment is advantageous, in particular, when the ejection region is arranged in the vertical direction above the pick-up region. Due to the tilting about the tilt axis it is achieved that the lower region of the lifting share with its lateral movement deflects further in the transverse direction than the ejection region and/or a bearing point of the lifting share. In particular, the movement is optimized thereby, such that the pick-up region and/or the lower or front face of the lifting share is laterally moved furthest in the offset position relative to the initial position. In this case, due to the tilting of the lifting share it is achieved that, directly after being picked up from the ground, the root crops are conducted at least partially in the transverse direction in the direction of the frame longitudinal plane, so that in the case of a plurality of lifting share mountings the root crops are able to be discharged over the width of the lifting device as evenly as possible onto the conveying element following the lifting shares. This conveying element is utilized at a uniformly high level, whereby the lifting capacity may be increased as a whole. Moreover, the mass moment of inertia to be overcome for the movement of the lifting share mounting, in particular the pick-up region, is reduced.

Particularly preferably, the guide arrangement is configured such that the lifting share mounting is at least partially pivotable about a diagonal pivot axis which at least in the initial position is located in the frame longitudinal plane and rises in the conveying direction. In particular, the diagonal pivot axis is at least substantially at right angles to a straight line which intersects the pick-up region and the ejection region of the lifting share in the initial position. By the position of the pivot axis the movement of the lifting share from the initial position into the offset position is further optimized and, in particular, only a reduced expenditure of force is required for a significant movement of the pick-up region in the transverse direction.

The diagonal pivot axis, the pivot axis and/or the tilt axis are arranged, in particular, in the initial position in the frame longitudinal plane. Preferably, with the movement of the lifting share mounting, the axes move into the offset position out of the frame longitudinal plane and thus are dynamic. Preferably, with the movement from the initial position into the offset position, the lifting share mounting pivots at least partially about three different spatial axes respectively at right angles to one another, in particular the three spatial directions. As a result, the movement may be optimized to the extent that the pick-up region is displaced as far as possible in the transverse direction, whilst the ejection region remains as far as possible at its location in the initial position, whereby due to a transverse force applied from the ground onto the lifting share in the offset position, together with a lifting resistance force acting counter to the lifting direction, in the absence of root crops to be harvested arranged to the side of the frame longitudinal plane, the lifting share mounting is automatically centered in the initial position.

Preferably, the lifting share is at least partially displaced in the lifting direction, with the movement from the initial position into the offset position. In particular, the lifting share mounting pivots about a front pivot axis arranged in the lifting direction upstream of the lifting share mounting and/or upstream of the lifting share which at least in the initial position is arranged in the frame longitudinal plane and, in particular, is arranged downwardly in the direction of conveyance and/or at right angles to the direction of conveyance. By means of this embodiment it is achieved in a structurally simple manner that the lifting share mounting is displaced to the front, whereby in the offset position, due to the lifting resistance force acting counter to the lifting direction, a self-centering of the lifting share mounting into the initial position is achieved, in particular, in the absence of root crops to be harvested. By means of the automatic centering, during operation the lifting share is automatically returned into the initial position in which the lifting share is located most frequently over time, whereby the times required for the manual adjustment of the lifting share mounting before starting to lift a new row of root crops are minimized.

Preferably, the guide arrangement comprises a plurality of guide bearings which are configured, in particular, as spherical bearings between the lifting share mounting and the lifting device frame. In particular, the lifting share mounting is integrally fastened by means of said guide bearings to the lifting device frame. The components of the guide bearings, in particular a spherical bearing and/or a spherical hearing socket, in this case are preferably arranged fixedly relative to the lifting share mounting or fixedly relative to the lifting device frame or integrally therewith. Spherical bearings are, in particular, characterized in that the heating partners are pivotable relative to one another via two different pivot axes, wherein in particular a displacement of the joint partners relative to one another is prevented. By the use of at least one spherical bearing, it is possible to transmit force from the lifting share mounting to the lifting device frame in a structurally simplified manner and at the same time a complex movement of the lifting share mounting relative to the lifting device frame is possible. As a result, the reliability and thus the performance of the lifting device is further increased.

In particular, at least in the initial position, at least one of the guide bearings which is configured as a spherical bearing is arranged centrally, i.e. in the frame longitudinal plane. As a result, in particular, it is possible to pivot the lifting share mounting from the initial position about various pivot axes, wherein both in the transverse direction and counter to the transverse direction the lifting share mounting has a uniform movement sequence which is mirrored relative to the frame longitudinal plane. As a result, root crops to be lifted and located both to the right and left of the frame longitudinal plane may be reached easily by the lifting share and, in particular, the pick-up region thereof.

Preferably the lifting share mounting is mounted by means of three guide bearings. These guide bearings span a bearing plane which is pivoted relative to the frame longitudinal plane, at least in the initial position, in particular also in the offset position. This means that at least two of the three guide bearings are spaced apart from one another transversely to the lifting direction and, in particular, are arranged on different sides of the frame longitudinal plane. In particular, the three guide bearings are configured as pivot bearings and the triangle spanned by the guide bearings is configured mirror-symmetrically relative to the frame longitudinal plane. By means of this arrangement a particularly stable, guided movement of the lifting share mounting from the initial position into the offset position is possible and forces may be transmitted in various spatial directions, in a particularly reliable manner, from the lifting share mounting to the lifting device frame. As a result, the lifting capacity is increased to the extent that the probability of malfunctions of the lifting device is minimized.

Preferably, the lifting share mounting is forcibly guided relative to the lifting device frame by the guide arrangement, in particular by the cited guide bearings. As a result, during operation the lifting share mounting moves relative to the lifting device frame on a movement path which is geometrically defined and fixed, in particular relative to the lifting device frame, and which in particular is mirror-symmetrical to the frame longitudinal axis. As a result, root crops may be picked up by the lifting device in a particularly wide region, and it is possible to avoid impacts, i.e. temporary large forces, on the lifting share mounting and thus on the lifting device frame.

Preferably, at least one guide bearing is arranged in the lifting direction upstream of the lifting share part which during operation penetrates the lowest point in the soil in the initial position. In particular, in this case all of the guide bearings of the guide arrangement are arranged upstream of this lifting share part. In particular, alternatively or additionally, the entire guide arrangement including a guide bearing and/or all guide bearings is arranged in the lifting direction upstream of a share rotational axis, during operation the lifting share rotating about said share rotational axis relative to the lifting share mounting. By the arrangement of the guide bearings in the front region of the lifting share mounting, the transmission of a pulling force on the lifting share mounting by the guide bearings is facilitated, whereby during operation a particularly simple guidance of the lifting share mounting and the lifting share is achieved along the row of root crops to be lifted. In particular, during operation the lifting share mounting is adjusted automatically in the transverse direction by this design of bearing arrangement using a simple construction, whereby an active adjustment is not necessary therefor. Preferably a rear guide bearing in the lifting direction functions as a support bearing, by which during operation a compressive force from the lifting share mounting to the lifting device frame is assisted, wherein the pulling force transmitted from the lifting device frame onto the lifting share mounting which, in particular, is transmitted by a plurality of guide bearings, is in particular larger in terms of size. The deviation in this case is caused by the lifting resistance force which acts counter to the lifting direction on the lifting share and which, in particular, during operation permits an automatic return of the lifting share mounting into the initial position. A particularly simple function of the lifting device is thus achieved by this arrangement of the guide bearing and/or guide bearings, and in particular complex components which are subjected, in particular, both to tension and compression and thus are associated with a high risk of malfunction are avoided.

In an advantageous embodiment of the invention, the guide arrangement comprises at least one guide element which is coupled by means of guide bearings both to the lifting share mounting and to the lifting device frame. The guide bearings in this case are preferably configured once again as spherical bearings. The guide element is configured, in particular, as a coupling rod between the lifting device frame and the lifting share mounting, and which is movable both relative to the lifting share mounting and to the lifting device frame. In particular the guide arrangement comprises at least one guide bearing which is formed, in particular, as a spherical bearing by which the lifting share mounting is directly mounted on the lifting device frame, and at least one guide element with guide bearings configured on both sides, in particular as spherical bearings, by which the lifting share mounting is mounted indirectly on the lifting device frame. By the use of the guide element, by a component which is only subjected to tension during operation, an increased mobility and a reliable guidance of the lifting share mounting into the offset position is achieved and thus the probability of malfunction is further reduced.

Particularly preferably, the guide hearing for connecting the guide element to the lifting device frame is arranged upstream in the lifting direction and relative to the horizontal above the respective guide bearing which serves for connecting the guide element to the lifting share mounting. As a result, the guide element extends upwardly in the lifting direction. As a result, during operation the pulling force from the lifting device frame is transmitted on the most direct path via the guide element onto the lifting device frame, whereby the probability of malfunction of the relevant components is minimized.

Preferably, the guide arrangement comprises two guide elements which at least in the initial position are arranged at least partially, in particular entirely, on different sides of the frame longitudinal plane and preferably as a mirror image relative thereto. In particular both guide elements in this case run in the initial position parallel to one another and preferably form thereby a parallel guidance. A parallel displacement is superimposed, in particular, by at least one pivoting movement during operation. Alternatively, the guide elements preferably form a trapezium.

Preferably, the guide elements coincide regarding their geometry or are configured to be mirror-inverted relative to one another. By the use of the two guide elements which are arranged, in particular, during operation upstream of the lifting share part which penetrates the lowest point in the ground in the initial position, a structurally simple guidance for the lifting share mounting may be implemented, by which a partial pivoting of the lifting share mounting about all three spatial axes is possible in a simple manner. In particular, by an additional bearing arrangement of the lifting share mounting directly on the lifting device frame, preferably by a spherical bearing arranged in the frame longitudinal plane, a particularly stable guidance of the lifting share mounting may be implemented, a high mobility of the lifting share being achieved thereby with minimum effort.

In an advantageous embodiment of the invention, the guide elements are configured to be variable in terms of length and comprise, in particular, a return element and/or a damping element. As a result, during operation the lifting shares are mounted flexibly and movably in at least two different directions during operation. A more protective interaction of the lifting shares with the root crops to be harvested is achieved by the flexibility, in particular the root crops are prevented from being inadvertently cut by the lifting share by a force acting between the lifting share and the root crops effecting an at least partial and/or temporary return of the lifting share mounting. Thus the proportion of damaged harvested root crops is reduced and the quantity of undamaged root crops to be lifted per time unit is increased.

Alternatively, the lifting share mounting preferably has just one degree of freedom relative to the lifting device frame. In this case, both the lifting share mounting and the lifting share is movable relative to the lifting device frame along a geometrically defined movement path. By this configuration of the lifting device the number of movable parts is reduced in favor of a more stable construction and thus the functional reliability is increased.

Preferably, two lifting shares are arranged on the lifting share mounting, in particular said lifting shares being arranged as a mirror image in the initial position on the frame longitudinal plane and preferably rotating during operation. The lifting shares in this case are, in particular, coulter disks which rotate during operation. In particular, the share rotational axes are not identical or parallel to one another but in particular tilted relative to one another, wherein with the arrangement of the lifting share mounting in the initial position both share rotational axes preferably intersect in the frame longitudinal plane. Viewed in the direction of the associated share rotational axes, in this case the lifting shares, in particular, have a substantially round circumference and preferably a cross section which runs at least partially axially.

The two opposing lifting shares form a gap therebetween which varies along the circumference of the lifting shares and/or along the circumference thereof. In particular, the gap in the circumferential direction between the pick-up region and the ejection region of both lifting shares is narrowest, in particular, in the lifting direction behind the share rotational axis and in the vertical direction below the bearing points. The pick-up region and the ejection region of both lifting shares is preferably fixed relative to the lifting share mounting. During operation the root crops to be lifted run relative to the lifting share mounting into the gap between the two lifting shares, which narrows in the rotational direction of the lifting shares and at the same time forms contact with the lower tapering half of the root crops, and lifts the root crops out of the ground with the outward movement of the lifting share part in contact with the root crops. After the gap has then widened in the rotational direction, the root crops leave the space between the two lifting shares from the ejection region thereof. By means of this configuration and the number of lifting shares arranged on the lifting share mounting, a particularly reliable pick-up of the root crops out of the ground is possible and a protective interaction is implemented thereby.

In an advantageous embodiment of the invention, the lifting device has an ejection element for separating the picked-up root crops from the lifting shares, in particular from the ejection regions thereof. The ejection element, in particular, is mounted on the lifting device frame and circulates during operation and, in particular, runs through the intermediate space of the two lifting shares. In particular, the ejection element is configured as a paddle wheel circulating transversely to the lifting direction and the horizontally arranged rotational direction of ejection. In this case, the width of the ejection paddles radially extending from the rotational axis of ejection is less than the gap between the ejection regions of the lifting shares. With a movement of the lifting share mounting out of the initial position or back into the initial position, the ejection element, in particular, is not movable in the transverse direction. The advantage of the use of the ejection element is a continuous flow of root crops which during operation of the lifting device are transferred to a downstream conveying element, wherein by the above-described movement of the lifting share mounting relative to the lifting device frame, the ejection element is able to be used with ejection blades extending particularly far in the transverse direction, since with the movement of the lifting share mounting the ejection regions only move slightly in the transverse direction. As a result, in addition to the wide-reaching adjustability of the lifting share in the transverse direction, an optimal interaction with the root crops and a reliable conveyance thereof is ensured.

In particular, the lifting device comprises an actuating means, in particular a hydraulic cylinder, the lifting share mounting being adjustable in a vertical direction and thus being able to be lifted out of the ground thereby. To this end, the lifting device frame, in particular, comprises a rocker arm which is tiltable about a rocker arm axis extending in the transverse direction. In particular, on the one hand, the lifting share mounting is arranged on the rocker arm by means of a spherical bearing and, on the other hand, the actuating means is arranged on the rocker arm. As a result, the lifting of the lifting share mounting with the at least one lifting share may be implemented by a structurally simple solution and thus in a particularly reliable manner.

The object is further achieved by a mobile harvesting machine with a drive unit comprising an above-described lifting device. The harvesting machine is configured, in particular, for harvesting root crops such as beets, potatoes or carrots and preferably has at least three contact elements circulating during operation and in contact with the ground, such as tires or chains, a driver's cab, a bunker for storing root crops and/or a drive unit. The lifting device is arranged, in particular, in the lifting direction upstream of the contact elements and thus leading during operation.

An advantage of the embodiment according to the invention of the lifting device for the operation of the harvesting machine is primarily a lower driving resistance to be overcome as a whole in the case of local cornering. According to the prior art, the lifting share mounting already achieves a lateral stop from slight deviations in the row of root crops to be harvested, which prevents a further deflection of the lifting share. For a cornering and/or steering movement of the harvesting machine, if the lifting share mounting is already located on the corresponding stop, a massive force has to be applied, since the at least one lifting share in this case has to be moved partially transversely through the ground. By the guidance according to the invention and the greater freedom of movement of the pick-up region of the lifting share relative to the lifting device frame, these increased forces are barely necessary during operation and the loads associated therewith are substantially avoided. As a result, the risk of malfunction of the harvesting machine is reduced.

In particular the application of, in particular, GPS-dependent steering systems and/or steering assistants is facilitated by the above-described advantage of the invention. During operation, the unavoidable local deviations from an ideal line which is dependent on the paths of the rows of root crops to be harvested, and which is optimally to be traveled upon, does not limit the lifting yield further, to the extent that the at least one pick-up region may laterally follow the row to be picked up thereby over a particularly wide area. By means of corrective steering which is also required in steering systems and/or steering assistants, in practice the lifting share mounting no longer reaches a stop, whereby the driving resistance to be overcome during steering and/or cornering due to the lifting share penetrating the ground is significantly reduced.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The features of the exemplary embodiments according to the invention described hereinafter may also be the subject of the invention both individually or in other combinations from those shown or described. If expedient, parts which are functionally the same are provided with the same reference numerals.

Figure 1:
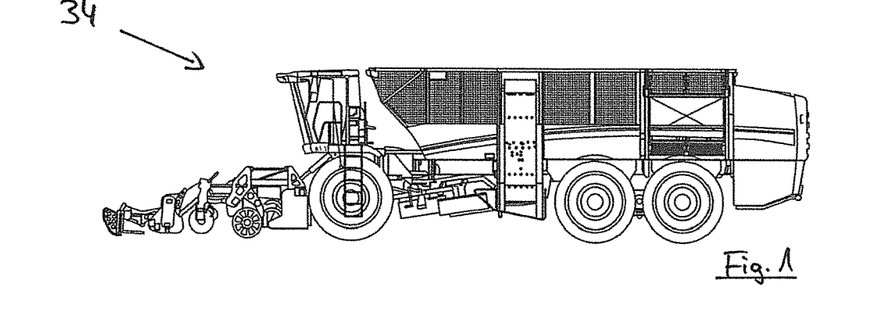
FIG. 1 shows a side view of a harvesting machine according to the invention.
Figure 2:
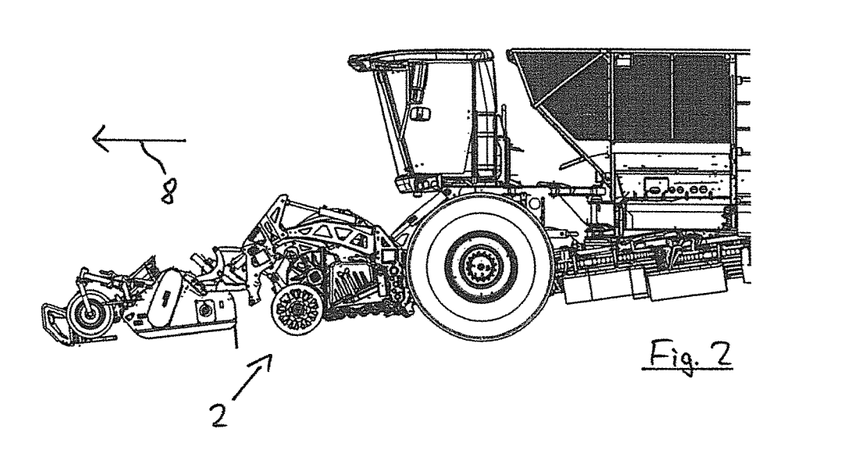
FIG. 2 shows an enlarged view of the front part of the harvesting machine according to FIG. 1.
Figure 3:
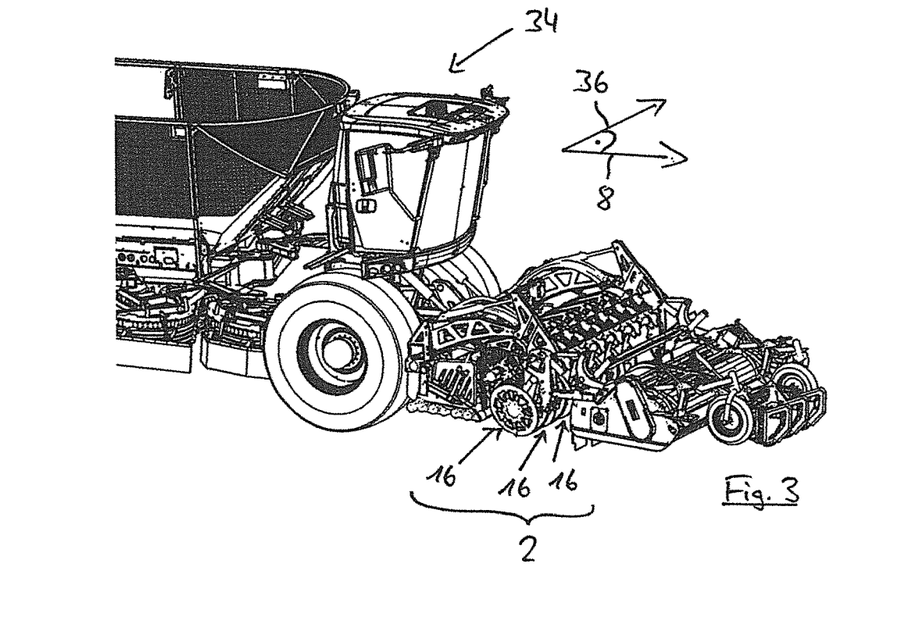
FIG. 3 shows an isometric view of the front part of the harvesting machine according to FIG. 2.
Figure 4:
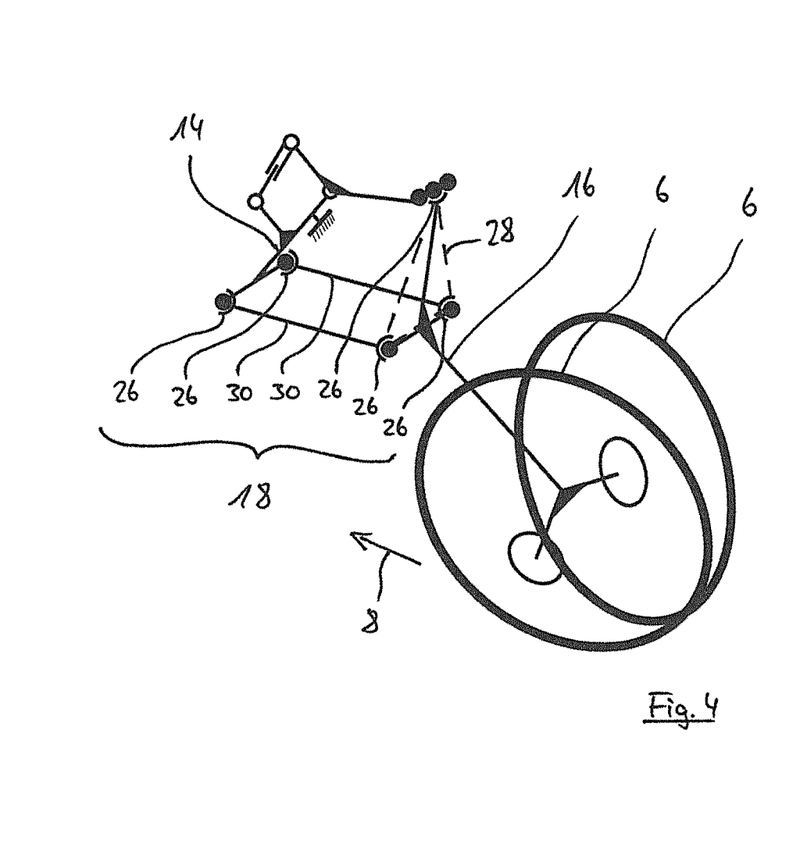
FIG. 4 shows an isometric schematic view of a lifting device according to the invention.

FIGS. 1 to 3 show a harvesting machine 34 according to the invention with a lifting device 2 according to the invention. The lifting device 2 in this case during operation leads in the lifting direction 8 relative to the wheels of the harvesting machine 34. The lifting device 2 comprises a plurality of lifting share mountings 16 which are arranged one behind the other in a transverse direction 36 at right angles to the lifting direction 8 and which have in each case two lifting shares 6.

FIGS. 4 to 10 show the lifting device 2 according to the invention in various views and from various perspectives. The lifting device 2 shown comprises a lifting share mounting 16 with two lifting shares 6. The lifting shares have a front pick-up region 10 in the lifting direction 8 and a rear ejection region 12 in the lifting direction 8 (see FIGS. 8 to 10). During operation, the lifting device 2 advances in the lifting direction 8, wherein the root crops 4 pass between the pick-up regions 10 of the lifting shares 6. By a rotation of the lifting shares 6, the root crops 4 are lifted at the same time out of the ground and then leave the intermediate space between the two lifting shares 6 from the ejection regions 12 of the lifting shares 6.

Figure 6:
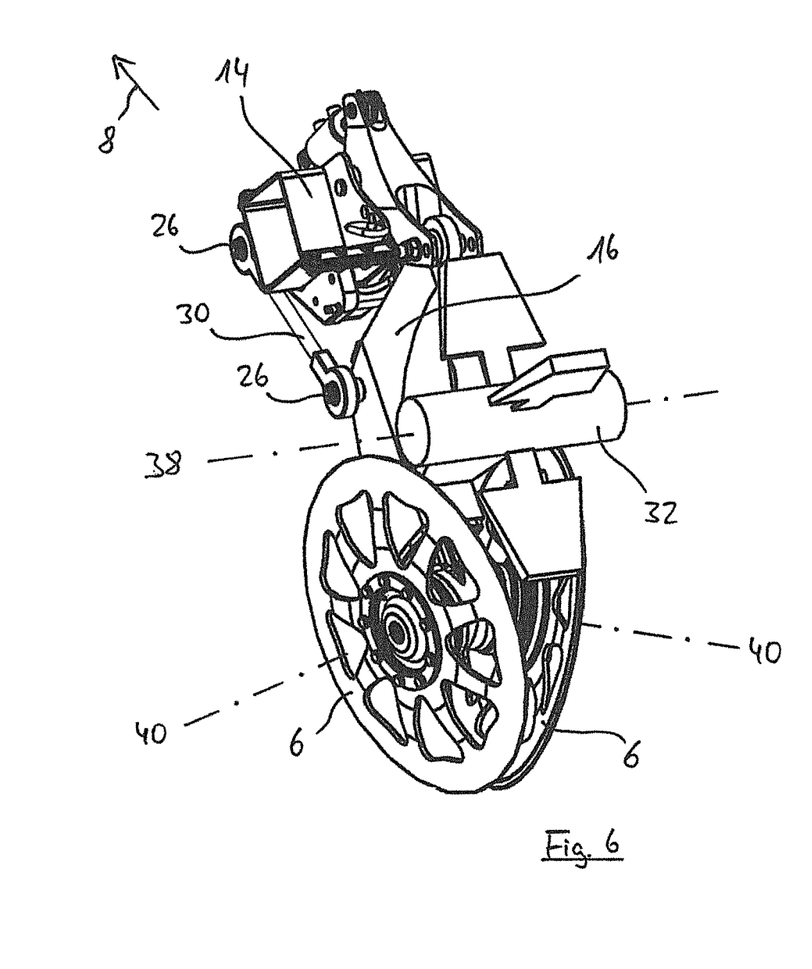
FIGS. 6 and 7 show isometric views of the lifting device according to FIG. 5.
Figure 7:
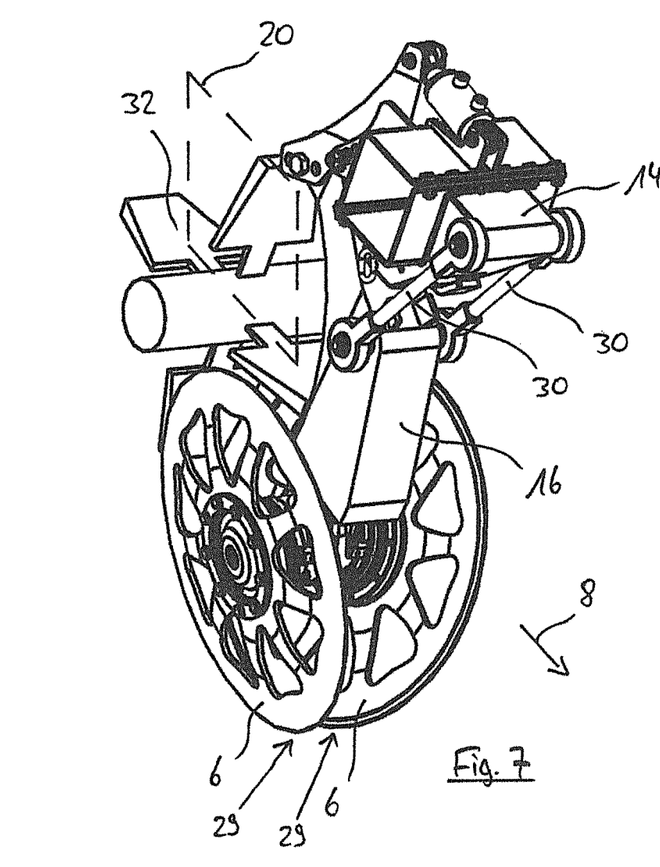
Figure 8:
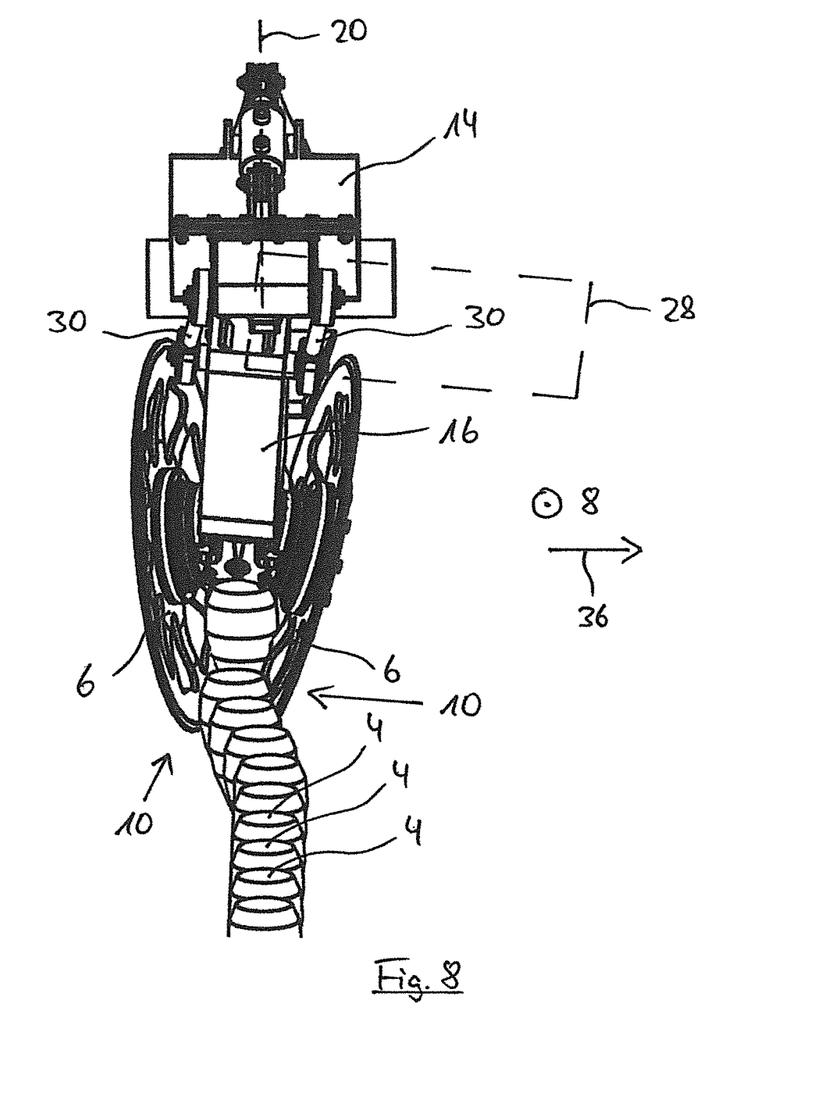
FIG. 8 shows a front view of the lifting device according to FIG. 5 during operation.
Figure 9:
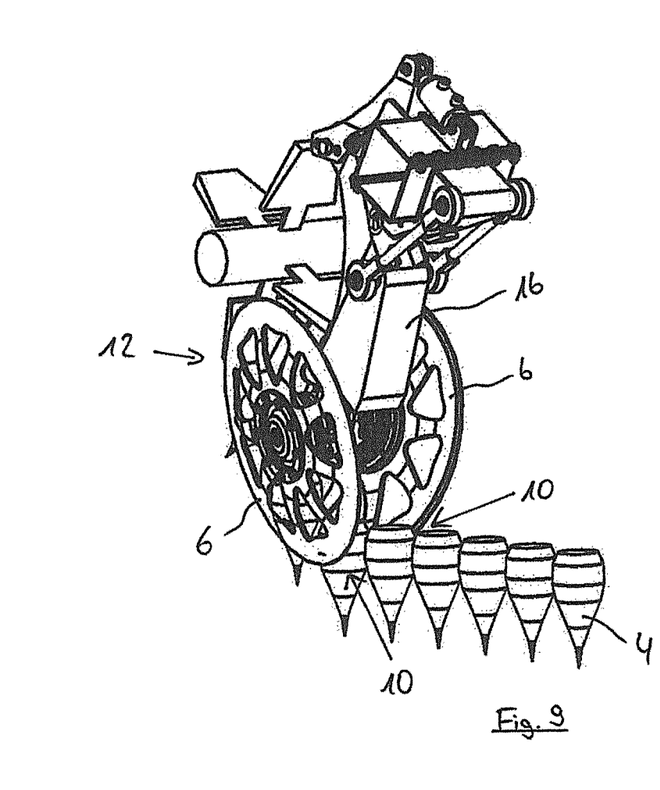
FIG. 9 and FIG. 10 show isometric views of the lifting device according to FIG. 5 during operation.
Figure 10:
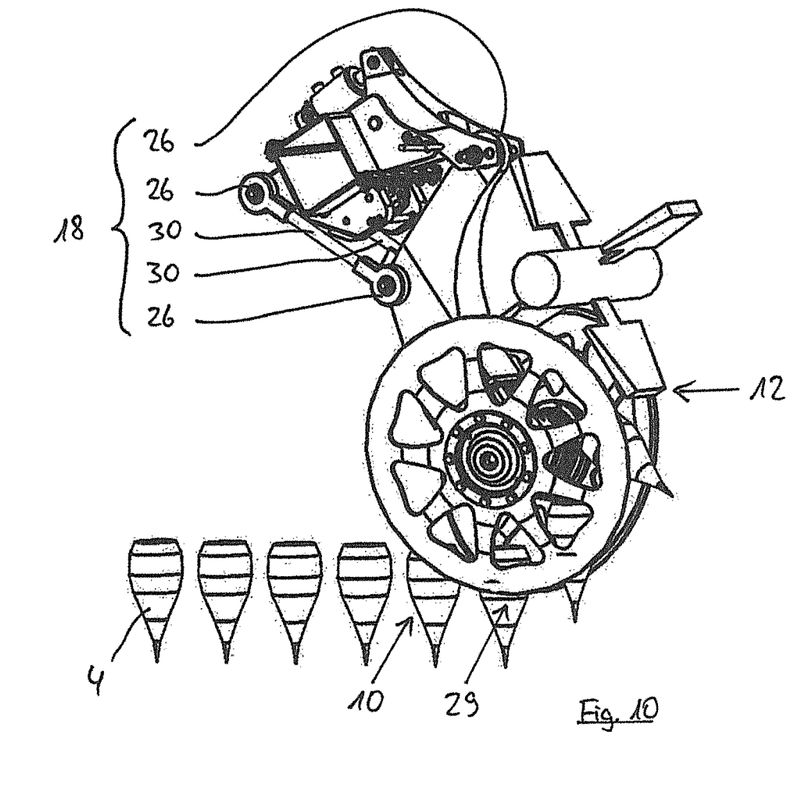

Both lifting shares 6 are rotatably mounted relative to the lifting share mounting 16 and in an initial position of the lifting device 2 are arranged mirror-symmetrically relative to a frame longitudinal axis 20 (see FIGS. 7 and 8). The share rotational axes 40 (see FIG. 6) in each case are pivoted by an angle<90° relative to the frame longitudinal axis 20 as a mirror-image of one another and accordingly intersect in the frame longitudinal axis 20.

The lifting share mounting 16 is coupled by means of the guide arrangement 18 to the lifting device frame 14, wherein during operation the lifting share mounting 16 is pulled by the lifting device frame 14. The guide arrangement 18 permits a lateral deflection of the lifting share mounting 16 when viewed in the lifting direction 8 and relative to the lifting device frame 14. As a result, the lifting device frame 14 is movable from an initial position (see FIGS. 4 to 7) into an offset position (see FIG. 8).

Figure 5:
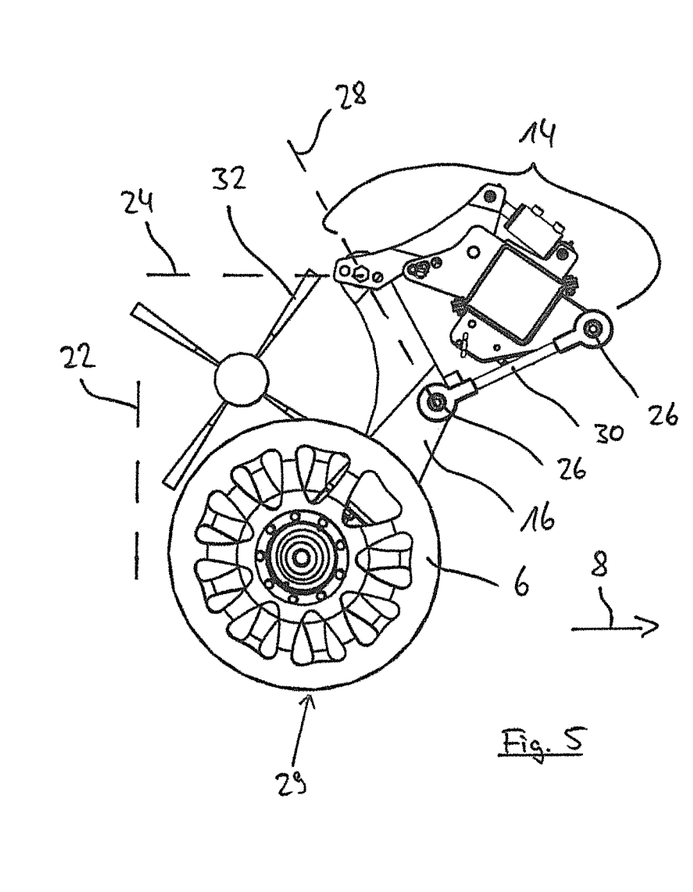
FIG. 5 shows a side view of a lifting device according to the invention.

The guide arrangement 18 is configured such that with the movement of the lifting share mounting 16 from the initial position into the offset position the pick-up region 10 is laterally displaced further than the ejection region 12. To this end, with the movement from the initial position into the offset position the lifting share mounting 16 is pivoted at least partially about a pivot axis 22, which pivots relative to a horizontal, in particular at right angles, and is arranged in the vertical frame longitudinal plane 20. Moreover, with the movement from the initial position into the offset position the lifting share mounting 16 tilts at least partially about a tilt axis 24 which is parallel to the lifting direction 8 and which, viewed in the lifting direction 8, is arranged above the lifting share 6. FIG. 5 is a side view taken from a perspective at right-angles to the frame longitudinal plane 20 and illustrates the positions of the pivot axis 22 and the tilt axis 24.

The guide arrangement 18 comprises in the exemplary embodiments shown by FIGS. 4 to 10 a total of five guide bearings 26 which are configured as spherical bearings, wherein the lifting share mounting 16 is directly mounted by means of three guide bearings 26. These three guide bearings 26 span a bearing plane 28 which is pivoted relative to the frame longitudinal plane 20 (see FIG. 4). In addition to the guide bearings 26, the guide arrangement 18 comprises two guide elements 30 which are configured as coupling rods and which on both sides are coupled by one respective guide bearing 26 to the lifting share mounting 16 and to the lifting device frame 14. The guide elements 30 are arranged in the initial position on different sides of the frame longitudinal axis 20 and, in particular, parallel thereto. Of the three guide bearings 26, the guide bearing which is not configured by one of the guide elements 30 is arranged centrally, i.e. inside the frame longitudinal axis 20.

All of the guide bearings 26 are arranged in the lifting direction 8 upstream of the lifting share part 29 which during operation penetrates the lowest point in the soil in the initial position (see FIG. 5). Thus during operation, pulling forces are transmitted by the guide elements 30 from the lifting device frame 14 onto the lifting share mounting 16.

The exemplary embodiment shown has an ejection element 32 which during operation passes through the intermediate space of the lifting shares 6 (see FIGS. 6 and 7). The ejection element 32 which is configured as a paddle wheel rotates during operation about a rotational axis of ejection 38 which is arranged during operation, irrespective of the position of the lifting share mounting 16, at right angles to the frame longitudinal axis 20.

During operation, the guide arrangement 18 enables the lifting share mounting 16 with the lifting shares 6 to follow a row of root crops 4 to be lifted, even if this row does not exactly extend in the lifting direction 8. With the movement of the lifting share mounting 16 from the initial position into the offset position, the lifting share mounting 16 is pivoted about all three spatial axes and, in particular, the pick-up region 10 is moved laterally further than the ejection region 12 (see FIG. 8). As a result, even root crops 4 which are located relatively far to the side of the frame longitudinal axis 20 may be picked up by the lifting device 2 and the non-displaceable ejection element 32 may still be used for the ejection of the root crops 4 from the intermediate space of the lifting shares 6. As the lifting shares 6 are displaced in the lifting direction 8 with the movement from the initial position into the offset position, in the absence of root crops 4 it leads to an automatic return of the lifting share mounting 16 into the initial position, due to a lifting resistance force oriented counter to the lifting direction 8.

The invention claimed is:

1. A lifting device for lifting root crops, the lifting device comprising:
   at least one lifting share mounting supporting at least one lifting share, the at least one lifting share having a front pick-up region in a lifting direction and a rear ejection region in the lifting direction for the root crops, the front pick-up region and the rear ejection region being fixed relative to the at least one lifting share mounting;
   a lifting device frame to which the at least one lifting share mounting is coupled, such that during operation the at least one lifting share mounting is pulled by the lifting device frame in along the lifting direction, the lifting device frame being laterally movable in a continuous or stepwise manner into an offset position;
   a pivot axis which is pivoted relative to the horizontal, and which is arranged in a vertical frame longitudinal plane in the lifting direction behind the at least one lifting share mounting,
   wherein said at least one lifting share mounting being movable relative to the lifting device frame and, viewed in the lifting direction, laterally from an initial position into an offset position, the at least one lifting share mounting pivoting at least partially about said pivot axis with the movement from the initial position into the offset position,
   wherein a guide arrangement is configured to guide the at least one lifting share mounting such that with the movement of the at least one lifting share mounting from the initial position into the offset position, the pick-up region is laterally displaced further than the ejection region.

2. The lifting device according to claim 1, further comprising a tilt axis parallel to the lifting direction, the at least one lifting share mounting tilting at least partially about said tilt axis, with the movement from the initial position into the offset position, wherein viewed in the lifting direction the tilt axis is arranged above the lifting share.

3. The lifting device according to claim 1, wherein the at least one lifting share mounting is displaced at least partially in the lifting direction, with the movement from the initial position into the offset position.

4. The lifting device according to claim 1, wherein the guide arrangement comprises a plurality of guide bearings, each guide bearing of the plurality of guide bearings being configured as a spherical bearing, between the at least one lifting share mounting and the lifting device frame.

5. The lifting device according to claim 4, wherein the at least one lifting share mounting is mounted by three guide bearings of the plurality of guide bearings which span a bearing plane which is pivoted relative to a frame longitudinal plane at least in the initial position.

6. The lifting device according to claim 4, wherein at least one guide bearings of the plurality of guide bearings is arranged in the lifting direction upstream of a lifting share part which during operation penetrates the lowest point in the soil in the initial position.

7. The lifting device according claim 4, wherein the guide arrangement comprises at least one guide element which is coupled by the plurality of guide bearings to the at least one lifting share mounting and to the lifting device frame.

8. The lifting device according to claim 7, wherein one of the guide bearings for connecting the at least one guide element to the lifting device frame is arranged upstream in the lifting direction and relative to the horizontal above a further of the guide bearings for connecting the guide element to the at least one lifting share mounting.

9. The lifting device according to claim 7, wherein the at least one guide element of the guide arrangement comprises two guide elements which at least in the initial position are arranged at least partially on different sides of a frame longitudinal plane as a mirror image relative thereto.

10. The lifting device according to claim 7, wherein the at least one guide element is configured to be variable in terms of length and comprise a return element and/or a damping element.

11. The lifting device according to claim 1, wherein two lifting shares of the at least one lifting share are arranged on the at least one lifting share mounting, the two lifting shares being arranged as a mirror image in the initial position on the frame longitudinal plane.

12. The lifting device according to claim 11, wherein the two lifting shares of the at least one lifting share rotate during operation.

13. The lifting device according to claim 1, further comprising an ejection element mounted on the lifting device frame and circulating during operation and partially running through an intermediate space of two lifting shares of the at least one lifting share supported by the same at least one lifting share mounting, for separating the picked-up root crops from the two lifting shares of the at least one lifting share.

14. A harvesting machine comprising a drive unit comprising a lifting device according to claim 1.

* * * * *

UNITED STATES PATENT AND TRADEMARK OFFICE
CERTIFICATE OF CORRECTION

PATENT NO. : 12,193,357 B2  
APPLICATION NO. : 17/284905  
DATED : January 14, 2025  
INVENTOR(S) : Klaus Pflipsen Page 1 of 1

It is certified that error appears in the above-identified patent and that said Letters Patent is hereby corrected as shown below:

In the Specification

In Column 6, Line 49, delete "hearing" and replace with -- bearing --

In Column 6, Line 53, delete "heating" and replace with -- bearing --

In Column 8, Line 31, delete "hearing" and replace with -- bearing --

In Column 12, Line 34, delete "hearings" and replace with -- bearings --

In Column 12, Line 46, delete "hearings" and replace with -- bearings --

Signed and Sealed this  
Thirteenth Day of May, 2025

Coke Morgan Stewart  
*Acting Director of the United States Patent and Trademark Office*